July 5, 1960  W. EWING ET AL  2,943,667
EXPANDING MANDREL HYDRO-PRESS
Filed Oct. 14, 1957  3 Sheets-Sheet 1

INVENTORS
WAYNE EWING
LESTER B. BACKUS JR.
BY
Attorneys

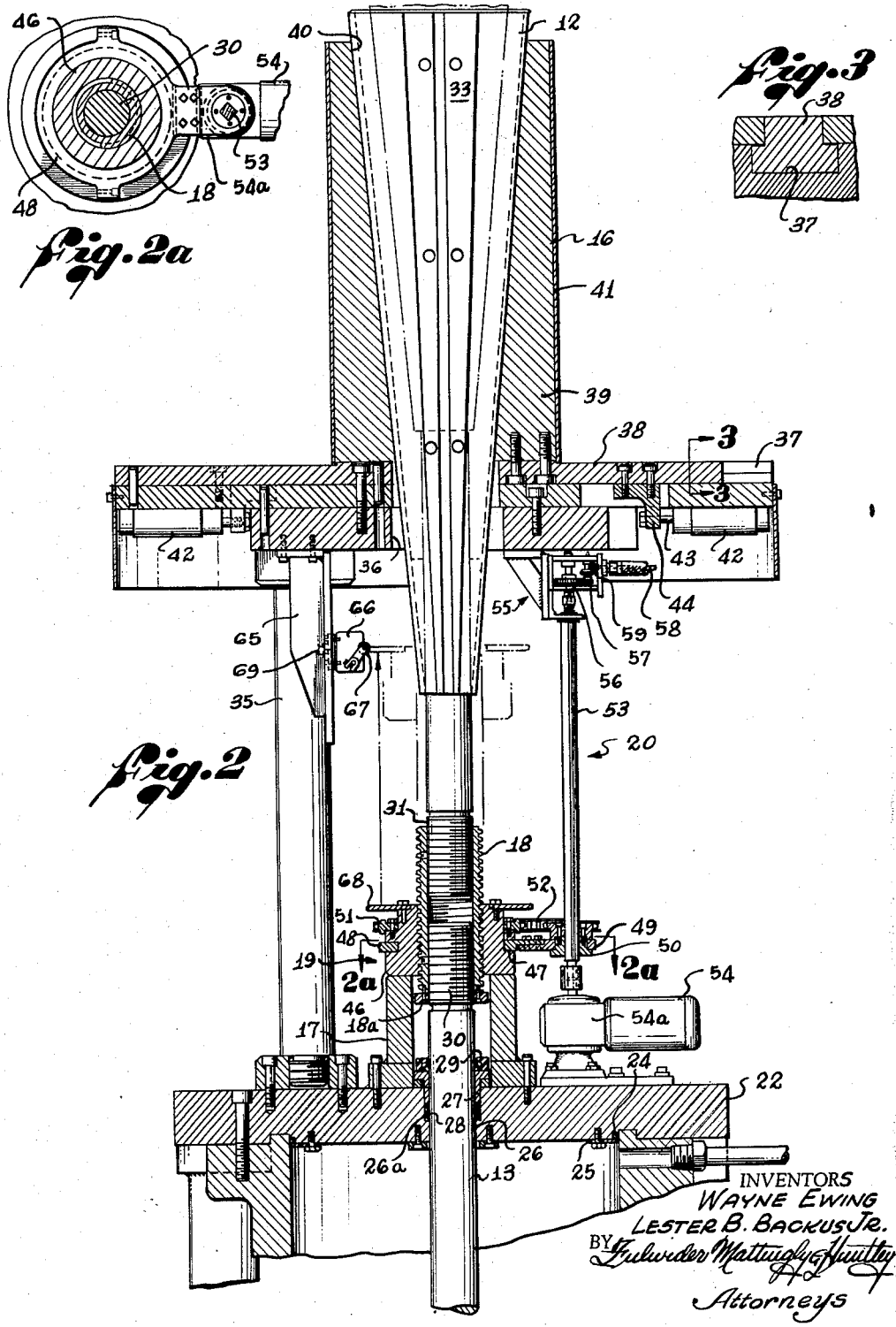

July 5, 1960   W. EWING ET AL   2,943,667
EXPANDING MANDREL HYDRO-PRESS
Filed Oct. 14, 1957   3 Sheets-Sheet 3
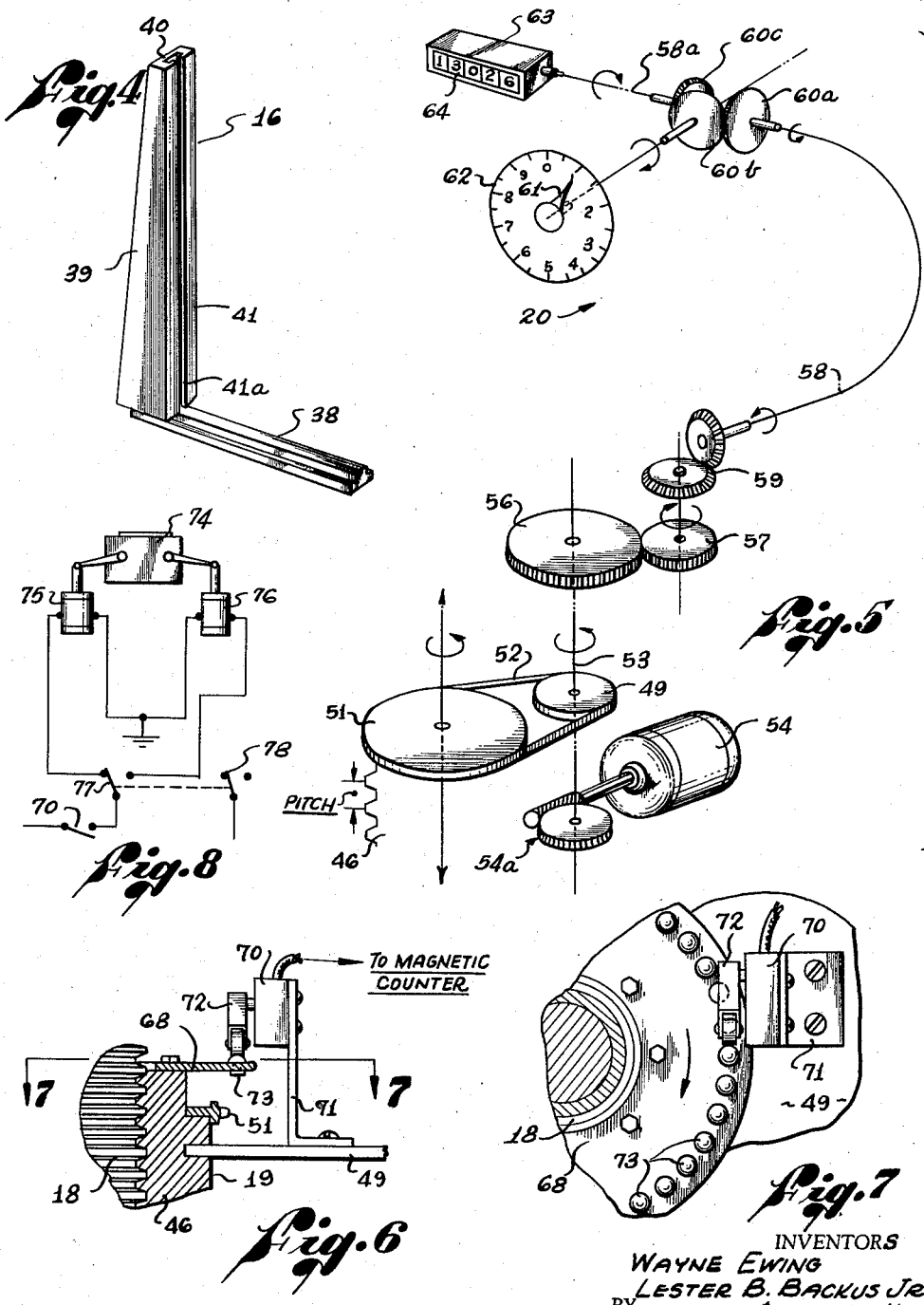
INVENTORS
WAYNE EWING
LESTER B. BACKUS JR.
BY
Attorneys

United States Patent Office 2,943,667
Patented July 5, 1960

2,943,667

EXPANDING MANDREL HYDRO-PRESS

Wayne Ewing, Los Angeles, and Lester B. Backus, Jr., Inglewood, Calif., assignors to Arrowsmith Tool & Die Corp., Los Angeles, Calif., a corporation of California Filed Oct. 14, 1957, Ser. No. 689,944

11 Claims. (Cl. 153—80)

The present invention relates generally to sheet metal working machines and particularly to an expanding mandrel hydropress for coldforming and sizing tubular parts.

The general arrangement of apparatus hitherto available for stretchforming and sizing tubular parts ordinarily comprises a plurality of die segments carried by a work table and adapted to be radially expanded from a common axis by a cone-shaped member or mandrel. The part to be formed is placed over the retracted die segments and power means connected by a drawbar to the mandrel are then actuated to reciprocate the mandrel. The die segments are thus moved radially through an expansion-retraction cycle to stretch the part beyond the yield point of its material to be permanently set into the desired expanded shape and size. The just-described method of sheet metal fabrication is a version of what is known generally in the art as "stretchforming."

Previously available machines of this type have been individually engineered and designed to meet a particular need. However, in recent years the stretchforming method of shaping sheet metal has found many new applications whereby the demand for such machines cannot be satisfied economically by specific purpose machines. Accordingly, it is desirable to provide an expander which is sufficiently versatile to meet an ordinary variety of stretchforming demands as well as special needs. A standardized machine of the type embodying the present invention can be manufactured and sold at greatly reduced cost since special design requirements are eliminated, and the machine has a longer useful life since it does not become obsolete due to changes in shape or size of the parts to be produced by it.

With the foregoing circumstances in mind, it is a major object of my invention to provide universal stretchforming apparatus which is capable of use in fabricating a wide variety of different sizes and shapes as opposed to the "single use" equipment heretofore available. For this purpose, the present apparatus includes means to interchangeably accommodate different sets of die segments in order to permit rapid changeover to production of new parts without alteration of the apparatus itself. At the same time, the apparatus can, if necessary, be adapted for production of extreme height and/or diameter parts by substitution of other head assemblies, and thus accommodate a variety of size ranges.

Another object of the invention is to provide an expanding mandrel hydropress that can be adjusted for a desired amount of expansion of a tubular part. To this end, the apparatus includes an adjustable, positive stop adapted to be set for any degree of expansion within the capacity of the apparatus, whereby it can easily be adapted to accommodate a variety of stretching operations.

It is also an object of the invention to provide an apparatus of this type that is capable of a high rate of part production even when the parts are to be formed to close tolerances.

Yet another object of the invention is to provide an expanding mandrel hydropress in which the cold flow of metal over the die faces is controlled to distribute the effects of such flow and prevent any localized thinning of the part which could lead to its rupture. As a consequence, very few scrap parts are produced and the risk of failure of parts in use is greatly minimized.

A further object of the invention is to provide a versatile, low-cost expanding mandrel press of rugged construction that will have a long service life.

The foregoing, and other objects and advantages of the invention will be apparent from the following description of a presently preferred embodiment thereof, and an alternate form thereof, when taken in connection with the annexed drawings, in which:

Figure 2 is a vertical sectional view of the apparatus shown in Figure 1;

Figure 2a is a sectional view taken on the line 2a—2a of Figure 2;

Figure 3 is a partial sectional view taken on the line 3—3 of Figure 2;

Figure 4 is a perspective view, on an enlarged scale, of one of the die-holding segments of the apparatus shown in Figure 1;

Figure 5 is a schematic view of a portion of the positive stop control means employed in the apparatus of Figure 1;

Figure 6 is a partial vertical sectional view of an alternate form of means for indicating and setting of the positive stops;

Figure 7 is a partial horizontal sectional view showing the alternate form of indicating means of Figure 6; and Figure 8 is a schematic diagram of the alternate form of indicating means.

Figure 1:
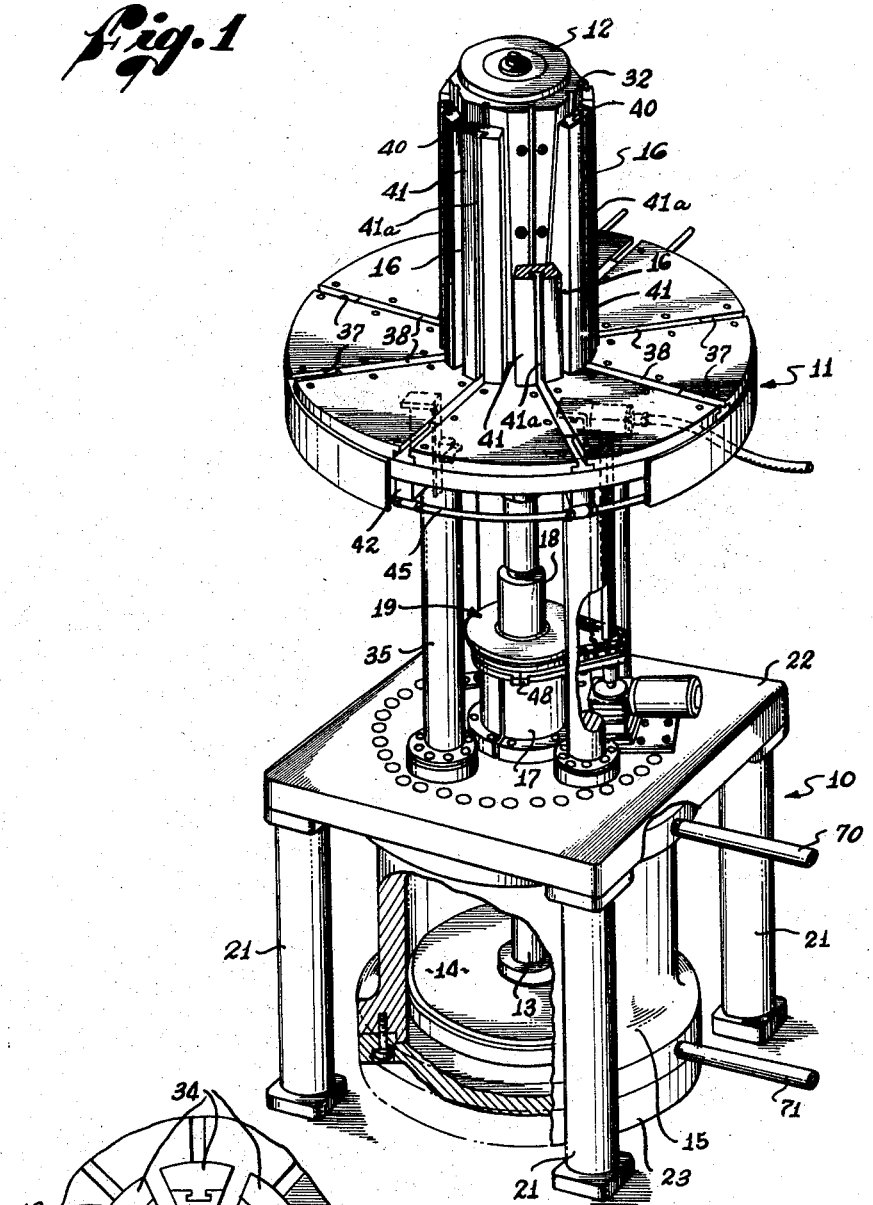
Figure 1 is a perspective view of an expanding mandrel hydropress embodying the invention, with parts thereof cut away to show certain details of construction.

Referring now to the drawings for the general arrangement of the invention, and particularly to Figure 1, there will be seen a base assembly 10 that supports a horizontally disposed circular work table 11 at an elevated position thereabove.

A tapered mandrel 12 having its larger end uppermost extends vertically through an opening in the center of work table 11 and has its lower end coupled through a drawbar 13 to a piston 14 enclosed in a cylinder 15 in the base assembly. A suitable source of hydraulic power (not shown) communicates with the cylinder 15 to cause reciprocating movement of piston 14 under the control of a stop assembly 19 to be described.

The upper surface of the work table 11 mounts a plurality of annularly grouped jaws 16 formed with an inner tapered face complementary to, and slidably engaged with the mandrel 12. Thus it will be seen that when the mandrel 12 is drawn downwardly, the jaws 16 being restrained against vertical movement, are expanded radially outwardly.

Each of the jaws 16 is adapted to support one of a plurality of a desired configuration of die segments whereby such expansion of jaws 16 results in stretchforming of a tubular part which has been placed around the jaws 16 and die segments. After the part has been expanded to the desired size and configuration, the mandrel 12 is raised and the jaws 16 are concurrently returned by means to be described, to radially innermost positions on table 11 whereby the finished part can be removed.

Mounted on top of the base assembly 10 is a flanged abutment 17 through which the drawbar 13 extends. Adjacent the top of the abutment 17 an internally threaded coupling 18 connects the upper end of drawbar 13 to the lower end of the mandrel 12. The coupling 18 is also formed with external threads and carries the vertically adjustable stop assembly 19 for setting any desired degree of spacing between the lower face of the stop assembly 19 and the upper face of the abutment. Details of the stop assembly 19 will be described later herein.

The stroke of the mandrel 12, and consequently the expansion of the jaws 16 can be varied by adjustment of the stop assembly 19 as will be described, and an indicator assembly, designated generally by the numeral 20 is coupled to the stop assembly 19 in order to give a direct reading of the mandrel stroke for any given setting of the apparatus.

The general organization of the press having been set forth, we turn now to a more detailed description of the construction. Specifically, the base assembly 10 includes four rigid corner posts 21 that support a substantially rectangular platform 22 securely affixed to the top end of cylinder 15. The platform 22 serves as an upper head for the cylinder 15 and also to support various other parts of the mechanism as will be described. The lower end of cylinder 15 is similarly closed by a lower head 23 and both heads of the cylinder are provided with suitable O-ring fluid seals 24 that are held in place by rigidly mounted retaining rings 25 (Figure 2).

The platform 22 is formed with a central bore 26 that is adapted to slidably receive the drawbar 13 whose lower end is rigidly fastened to the piston 14 as aforesaid. The bore 26 is counterbored and threaded at 26a to receive a packing gland 27, packing 28, and an oil seal ring 29 to prevent loss of fluid from cylinder 15 during extension and retraction of drawbar 13. The edge of the piston 14 is adapted to hold suitable packing (not shown) as is customary to provide a fluid seal between opposite sides of a piston.

Above its cylindrical lower end 31 the mandrel 12 develops into an upwardly and outwardly tapered head 32 that may be of any desired cross-section. In the illustrated embodiment of the invention the mandrel head 32 is of regular polygonal cross-section having a plurality of centrally grooved flat faces 33.

The work table 11 is rigidly supported above the base assembly 10 by a plurality of vertical columns 35 and is provided with a central opening 36 sufficiently large in diameter to permit the mandrel head 32 to clear the opening 36 when at the extreme lower end of its stroke. A plurality of radially extending T-slots 37 are formed in the upper surface of the work table 11, each of said T-slots being in a plane normal to the plane of one of the flat faces 33 of mandrel head 32. As seen best in Figure 3, the T-slots 37 are adapted to slidably receive a complementarily shaped foot member 38 (see Figure 4) of jaws 16.

Figure 1A:
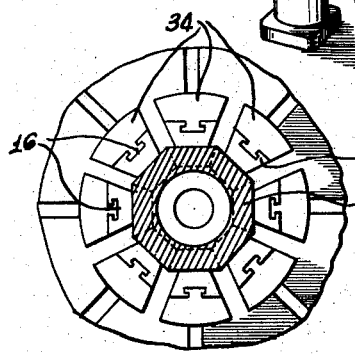
Figure 1a is a partial top plan view of the hydropress in expanded position.

Each jaw 16 includes a vertical leg member 39 that is rigidly affixed to the radially innermost end of the foot member 38 (Fig. 4). As previously stated, the radially inner face 40 of each leg member 39 is formed with a taper complementary to the taper of flat faces 33 of mandrel head 32, while the radially outward face 41 of each leg member 39 has a vertical longitudinally extending T-slot 41a that is adapted to slidably receive a complementarily shaped rib of a die segment 34 (see Figure 1a). With this arrangement, the jaws 16 are adapted to hold replaceable die segments 34 and when it is desired to form a new part of larger diameter or different shape a new set of die segments can be inserted in the respective jaws 16.

It will be noted from Figure 2 that the leg members 39 of the jaws 16 can be removed from the foot members 38. Accordingly, if it is desired to use the apparatus for forming parts of unusually small diameter the die segments 34 can be adapted for direct attachment to the foot members 38 in place of the vertical leg members 39. In such an arrangement the inner faces of the die segments would be tapered to slidably abut the flat faces 33 of the mandrel head 32.

As is apparent, in order to expand a part the piston 14 is actuated to pull the mandrel 12 downwardly whereby the jaws 16 with their associated die segments 34 are expanded radially outwardly in the work table slots 37. After the part has been expanded to the desired size and shape, the piston 14 is caused to move upwardly, also carrying the mandrel 12 upwardly. During such upward movement of the mandrel 12 it is desirable to simultaneously force the jaws 16 and die segments 34 inwardly away from the expanded part. In order to accomplish this, the work table 11 is provided with a plurality of return cylinders 42, each of which is drivingly connected to one of the foot members 38.

As is shown in Figures 1 and 2, each of the return cylinders 42 is rigidly affixed to the underside of the work table 11, directly under one of the slots 37 and at the radially outermost end thereof. A circular manifold 45 is connected in parallel to all of the return cylinders 42 and the manifold, in turn, is in communication with a source of hydraulic fluid under pressure (not shown). A suitable valve and switch arrangement (not shown) is operatively associated with the manifold 45 whereby the return of jaws 16 takes place concurrently with the raising of the mandrel 12.

The construction of hydraulic cylinders per se being well known, a detailed description of the construction of the return cylinders is deemed unnecessary. Suffice it to say that each cylinder 42 houses a piston (not shown) which is fastened to the inner end of a piston rod 43 which slidably protrudes from the radially innermost end of cylinder. The outer end of each piston rod 43 is fastened to a generally L-shaped bracket 44 (see Figure 2). Socket head bolts or the like are recessed in the foot member 38 of each jaw 16 in order to connect the brackets 44 thereto, the heads of these bolts being countersunk beneath the plane of the upper surface of work table 11.

This arrangement of return cylinders 42 is well adapted to return the jaws 16 in unison as the mandrel 12 is raised. However, in lieu of these hydraulic means of returning jaws 16, the jaws or the die segments carried thereby can be equipped with suitable springs at the upper and lower ends thereof which will at all times bias the jaws 16 towards radially innermost position.

In order to avoid a high percentage of scrap in the stretchforming of tubular parts, it is very important that each part be expanded by precisely the same amount. Accordingly, it is desirable that the apparatus include stop means definitely limiting the operative stroke of the stretching jaws 16. Furthermore, since the apparatus is intended to accommodate a wide range of part sizes, it is desirable to provide stop means as above described that are adjustable for any desired degree of expansion within the range of the apparatus. In the present invention this result is achieved by the stop assembly 19 which is adjustably carried on the exterior threads of the coupling 18.

By means of the adjustable stop assembly the length of the stroke of the mandrel 12 is determined by pre-setting the spacing between the lower face of the stop assembly 19 and the upper face of the abutment 17. The operative movement of the stop assembly 19 is illustrated in Figure 2 wherein the stop assembly 19 is shown in full line at the expansion end of the mandrel stroke and is indicated in dotted line at the retraction end of the mandrel stroke.

The stop assembly 19 includes an internally threaded collar 46 adjustably mounted on the coupling 18. A stop ring 18a is affixed to the lower end of coupling 18 to prevent the collar 46 from being screwed off of coupling 18. The collar 46 is adjusted vertically by power-rotating it to drive it upwardly or downwardly as desired along the threaded coupling 18, through a drive sprocket 50 and a driven sprocket 51 intermeshed with a drive chain 52.

To maintain optimum drive conditions for the sprocket-chain drive 50—51 and 52 it is desirable that these elements all be carried along with the collar 46 as it moves up or down along the coupling 18. To this end the collar 46 has an annular groove 47 adapted to rotatably receive two mating segments of a split ring 48. One of the segments of the split ring 48 is formed with a projecting ear which is affixed to a bearing 49 which rotatably receives the drive sprocket 50 (Figure 2a).

Thus the collar 46 and its drive sprockets and chain constitute a unitary assembly held in their proper relative operative positions by the split ring 48 and carried with the collar 46 as it translates along the coupling.

Above the annular groove 47 the collar 46 is formed with a shoulder to which is secured the driven sprocket 51 placing the latter in the same horizontal plane with the teeth of the drive sprocket 50.

Power is delivered to the drive sprocket 50 by a vertically extending drive shaft 53 whose lower end is coupled through a reduction gear assembly 54a to a motor 54 mounted on top of the base assembly 10. The shaft 53 is of square cross section or alternatively may be splined and passes through a correspondingly shaped center hole of the drive sprocket 50 so that the sprocket 50 can slide freely in a vertical direction along the shaft being at all times in rotary driving engagement therewith.

It will be realized that due to the positive drive connection between the shaft 53 and the collar 46 the precise position of the collar along the coupling 18 may be determined by counting the number of turns of the drive shaft required to move the collar to such position. The indicator means now to be described makes use of this relationship.

The upper end of drive shaft 53 in journalled in a bearing bracket 55 affixed to the underside of work table 11 (Figure 2). The bracket 55 also supports a spur gear 56 coaxially coupled to the drive shaft 53 and a pinion 57 meshing with the spur gear 56. One end of a flexible shaft 58 terminates at the bracket 55 where it is coupled to the pinion 57 by means of a pair of miter gears 59. As will presently appear, this arrangement comprises a portion of the indicator assembly 20 through which the operator of the apparatus can determine the setting of stop assembly 19 relative to the abutment 17.

The indicator assembly 20 is schematically shown in Figure 5 wherein it will be noted that the flexible shaft 58 leads to a train of three miter gears 60a, 60b, and 60c. The shaft of the intermediate gear 60b carries an indicating needle 61 that is centered on the graduated face of a dial 62. A shaft 58a of the gear 60c is drivingly connected to a mechanical counter 63 located along with the dial 62 and other controls for the apparatus, at the operator's position at work table 11.

The counter 63 may be of a commercially available type having a window through which the conventional series 64 of synchronized number wheels may be viewed.

The counter 63 is preferably calibrated to indicate directly at 64, the spacing between the lower face of the stop assembly 19 and the upper face of the abutment 17. For example, as is illustrated in Figure 5, the indicated spacing, i.e. mandrel stroke would be 13.026 inches. Ordinarily, the permissible tolerance in the stroke of the mandrel will be in terms of thousandths of an inch, but the setting is readable in tens of thousandths on the dial 62. Therefore, a very fine adjustment of the stop assembly 19 can be achieved; for example, the dial 62 will show just how far short or long of the desired setting of 13.026 inches the stop assembly 19 is actually set (i.e. .0001 inch long, as indicated by the needle 61). As will be apparent, the pitch of the external threads on the coupling 18 and the gear ratios through the assembly 20, comprise a reduction ratio in a predetermined proportion whereby the counter 63 at all times gives a direct reading at 64 of the setting of stop assembly 19 above the abutment 17. Alternatively the total reduction ratio can be made to take into account the taper of the flat faces 33 of mandrel 12 whereby the indicator assembly 20 can be calibrated to give a direct indication of the total diametric expansion for which the apparatus is adjusted, rather than a reading of the stroke of the mandrel 12.

In Figures 1 and 2 the mandrel 12 is illustrated as being at the bottom of its stroke, i.e. the stop assembly 19 abuts the upper face of the abutment 17. When the mandrel 12 reaches this lower limit position the hydraulic fluid in the cylinder 15 abruptly increases in pressure. In order to raise the mandrel 12 after it has reached the bottom of its stroke the cylinder 15 is provided with a pressure switch (not shown) that responds to the above-mentioned pressure increase in the cylinder 15 to operate a conventional four-way valve to release pressure above the piston 14 and apply such pressure to the underside thereof.

In order to stop the mandrel 12 when it has been raised a predetermined amount the underside of the work table 11 rigidly mounts a bracket 65 to which a microswitch 66 is affixed. The microswitch 66 controls an electrical circuit for closing a valve to close the underside of piston 14 to the source of fluid pressure. The switch 66 is positioned in such a way that its switch arm 67 extends inwardly into the path of a circular flange or plate 68, that is carried on the upper face of the member 46. The switch 66 is vertically adjustably mounted on the bracket 65 by means of a set screw 69 adapted to engage a vertical slot (not shown) on the bracket 65.

In use the apparatus is preferably set up so that the operator will stand on substantially the same plane as the upper face of the work table 11. All of the controls for the apparatus are preferably disposed in convenient position for reach by the operator on an auxiliary stand or the like. Such controls include a switch for controlling means to raise, lower and stop the mandrel independently of the automatically actuated switches just described, and switch means to control the motor 54 for adjusting the position of the stop assembly 19 on the coupling 18.

As has already been noted the return cylinders 42 are synchronized through suitable switches and valves for actuation simultaneously with the upward stroke of the mandrel 12.

When it is desired to form and size a particular tubular part, suitable die segments are inserted into the holding slots 41a of the jaws 16. With the mandrel 12 in fully raised position, the stop assembly 19 is then adjusted for the desired stroke of the mandrel 12 by energizing the motor 54 in an appropriate direction to raise or lower the stop assembly 19 along the coupling 18. When the reading 64 on the counter 63 indicates the desired setting, the motor 54 is de-energized. The upper limit of the mandrel stroke is then set by moving the switch 66 along its bracket 65 until it is in operative contact with the plate 68 and locking the switch to the bracket at that point. The apparatus is then ready to commence forming and sizing of any number of tubular parts.

The mandrel 12 being raised, the die segments carried by jaws 16 will be grouped in radially innermost position and adapted to receive the tubular part to be expanded, which is then placed over the die segments to rest on the work table 11. Through suitable controls the source of fluid pressure is communicated to the upper side of the piston 14, via a conduit 70, to force the mandrel 12 downwardly and to expand the jaws 16. When the lower face of the stop assembly 19 abuts the stop collar 17, further expansion of the part is prevented and fluid pressure rises in the cylinder 15. After such pressure has reached a predetermined point the afore-mentioned pressure switch actuates valve means to communicate the underside of the piston 14 to the source of fluid pressure via a conduit 71, whereby the mandrel is caused to rise. The rising of the mandrel 12 will continue until the plate 68 on the upper end of stop assembly 19 strokes the switch arm 67 whereby a valve is closed to prevent further delivery of pressure fluid to the underside of the piston 14.

Concurrently with the upward stroke of the mandrel 12, the jaws 16 are urged radially inwardly by the return cylinders 42, in response to the delivery of pressure fluid thru the manifold 45. The microswitch 66 in addition to being adapted to stop the upward stroke of the mandrel 12 is also connected to control closing of the manifold 45. After the mandrel 12 has been fully raised, the formed and sized part can be lifted from the die segments on the jaws 16 and a new, unformed part placed thereon.

When a part is to undergo a relatively small percent of elongation in being stretch formed, it can be completed with one stroke of the mandrel, in the manner just described. However, if the part is to undergo a large percent of elongation, or if it is not readily malleable, the mandrel is employed in another manner to avoid rupturing the part; i.e. the part is sequentially expanded and rotated to avoid localized thinning of the part material.

It will be observed that as the die segments 34 are expanded, that they also separate circularly, so that longitudinally extending portions of the part being formed are not in contact with the die faces. Such portions will undergo greater expansion and thinning than those portions of the part against the die faces, which are frictionally held against expansion. Therefore, in forming certain parts it is desirable to initially expand the part for only a portion of the total specified expansion and then rotate the part to move different longitudinal portions thereof to positions between the die segments. Thus the part can undergo several stages of expansion and rotation whereby thinning of the part is more uniformly circularly distributed throughout its material.

In carrying out this method of operation, the stop assembly 19 is initially adjusted to permit only a portion of the total desired expansion of the part. After the part has been expanded to the extent permitted by the then position of stop assembly 19, it is rotated as aforesaid and the stop assembly 19 once again adjusted. This sequence of expansion and rotation is continued until the counter 63 indicates that the ultimate desired expansion has been achieved.

An alternate form of indicator assembly is shown in Figures 6, 7 and 8. In this form the stop assembly 19 is raised and lowered as in the previously described embodiment of the invention. However, in lieu of the previously described arrangement of flexible shaft 58, with its associated gear drive and mechanical counter 63, electric means for activating a solenoid actuated counter are provided.

In the alternate form shown in Figures 6, 7 and 8, a microswitch 70 is affixed to a bracket 71 mounted on the bearing member 49. The microswitch 70 has a switch arm 72 on the inner side thereof overhanging the outer edge of the annular plate 68 carried on the upper end of the stop assembly 19. The switch arm 72 is spring biased downwardly into engagement with the plate 68 and in alignment with a plurality of brazier head rivets 73 that are equally circularly spaced around the outer edge of the plate 68. Thus, as the assembly 19 is rotated in response to actuation of the reversible motor 54, the microswitch 70 is actuated each time the switch arm 72 is pressed upwardly by engagement with the head of a rivet 73.

The microswitch 70 is connected in an electrical circuit such as is shown schematically in Figure 8. In this arrangement, a mechanical counter 74 is operatively associated with the cores of a pair of solenoids 75 and 76. The solenoid 75 is adapted to actuate the counter in an increasing direction, while the solenoid device 76 actuates the counter 74 in a decreasing direction. Both of the solenoids 75 and 76 are connected in an electrical circuit with a single pole double throw switch 77, which is in turn connected in series with the microswitch 70.

The switch 77 is mechanically linked to a switch 78, that controls the reversible motor 54, and its position is controlled by actuation of the motor switch 78. Thus when it is desired to increase the mandrel stroke the motor switch 78 is closed in the desired direction, simultaneously closing the switch 77 in a direction to complete the circuit to the solenoid device 75. Thereafter, as the assembly 19 rotates, the microswitch 70 is momentarily closed each time a rivet 73 contacts the switch arm 72, whereby electrical impulses are transmitted to the solenoid device 75. As is apparent, any desired spacing can be set up between the rivets 73 to indicate a predetermined unit of mandrel stroke length, so that each impulse to the solenoid device 75 will actuate the counter 74 in an increasing direction.

Conversely if the motor switch 78 is closed in the opposite direction, i.e. to cause downward adjustment of the stop assembly 19, the switch 77 is simultaneously closed in a corresponding direction to complete the circuit to the solenoid 76. Thereafter, each impulse transmitted to the solenoid 76 upon closing of the microswitch 70 will cause actuation of the counter 74 in a decreasing direction.

While there have been shown herein a number of embodiments of the present invention, it will be apparent that various modifications and changes may be made with respect to the foregoing description without departing from the spirit of the invention or the scope of the following claims.

We claim:

1. An expanding mandrel press comprising: a work table having a central opening therethrough; a plurality of expander jaws grouped around the opening of said work table and radially movably mounted on said table; a longitudinally reciprocable mandrel extending through said work table opening, said mandrel and said jaws being formed with means to translate movement of said mandrel in one direction into radially outward movement of said jaws in order to expand a tubular part placed around said jaws; power means connected to said mandrel to reciprocally move said mandrel; means operatively associated with said mandrel to define an adjustable positive stop for the expansion stroke of said mandrel; and means responsive to adjusting movement of said stop means to indicate the length of said expansion stroke.

2. An expanding mandrel press comprising: a horizontally disposed work table having a centrally disposed opening therethrough; a plurality of expander jaws grouped around said work table opening and radially movably mounted on said table, each of said jaws being formed with a tapered inner face; an axially reciprocal mandrel extending vertically through said work table opening and having a tapered head thereon extending above said table, the taper of said head being complementary to the taper of said inner jaw faces to translate axial movement of said mandrel in a first direction into radial expansion of said jaws; power means connected to said mandrel to reciprocally move said mandrel; means under said table defining a relatively fixed abutment adjacent to the lower end of said mandrel; a rigid stop element carried by the lower end of said mandrel and vertically adjustably movable therealong in vertical alignment with said abutment, said stop element and said abutment providing an adjustable positive stop to limit movement of said mandrel in said first direction; means adapted for response to adjusting movement of said stop element to indicate the length of the stroke of said mandrel in said first direction; and means on said work table to return said jaws to radially innermost position when said mandrel is moved oppositely to said first direction.

3. An expanding mandrel press comprising: a base; a horizontally disposed work table rigidly mounted on said base at an elevated position thereabove, said work table being formed with an opening in the center thereof; a plurality of jaws circularly grouped around the center of said table and radially movably mounted on said table, each of said jaws being formed with a downwardly and inwardly tapering inner face and each of said jaws on its outer face being provided with means to removably support a die segment; a vertically disposed mandrel extending above and below said table through said opening, the head of said mandrel being formed with a taper complementary to the taper of said jaws to translate downward movement of said mandrel into radially outward movement of said jaws in order to expand a tubular part surrounding said die segments; power means in said base connected to the lower end of said mandrel to vertically reciprocate said mandrel; means on said base adjacent the lower end of said mandrel to define a relatively fixed abutment; a stop element carried on the lower end of said mandrel in vertical alignment with said abutment, said element being axially adjustable along said mandrel to define a predetermined length of downward stroke of said mandrel between said element and said abutment whereby to positively limit the expansion of said jaws and die segments; a remotely positioned indicating means operatively associated with said stop element to measure the adjusted spacing between said element and said abutment; and means on said work table to retract said jaws from expanded position when said mandrel is raised.

4. An expanding mandrel press comprising: a base; a horizontally disposed work table rigidly mounted on said base at an elevated position thereabove, said work table being formed with an opening in the center thereof; a plurality of jaws circularly grouped around the center of said table and radially movably mounted on said table, each of said jaws being formed with a downwardly and inwardly tapering inner face and each of said jaws on its outer face being provided with means to removably support a die segment; a vertically disposed mandrel extending above and below said table through said opening, the head of said mandrel being formed with a taper complementary to the taper of said jaws to translate downward movement of said mandrel into radially outward movement of said jaws in order to expand a tubular part surrounding said die segments; a hydraulic motor in said base comprising a cylinder, a piston enclosed in said cylinder and a drawbar coupled to said piston that protrudes upwardly from said cylinder in alignment with said mandrel; a source of fluid pressure; means to selectively communicate said source with opposite sides of said piston to vertically reciprocate said piston; a tubular coupling connecting the lower end of said mandrel to the upper end of said drawbar; a stop assembly threadedly mounted on said coupling for axially adjustable movement thereon; means to releasably hold said stop assembly in vertically adjusted position on said coupling; a stop collar affixed to said base through which said drawbar extends, said stop collar providing an abutment against which said stop assembly is seated when said mandrel is lowered; a mechanical counter responsive to rotation of said assembly on said coupling that is calibrated to measure the spacing between said stop assembly and said stop collar when said mandrel is in raised position; and means on said work table to retract said jaws from expanded position when said mandrel is raised.

5. A device as set forth in claim 4 in which said means to retract said jaws comprises: a plurality of hydraulic pressure cylinders, each of which is mounted on said table and operatively connected to one of said jaws for linear actuation thereof; and means communicating said pressure cylinders to said source for actuating said cylinders concurrently with raising of said mandrel.

6. An expanding mandrel press comprising: a base; a horizontally disposed work table rigidly mounted on said base at an elevated position thereabove, said work table being formed with an opening in the center thereof; a plurality of jaws circularly grouped around the center of said table and radially movably mounted on said table, each of said jaws being formed with a downwardly and inwardly tapering inner face and each of said jaws on its outer face being provided with means to removably support a die segment; a vertically disposed mandrel extending above and below said table through said opening, the head of said mandrel being formed with a taper complementary to the taper of said jaws to translate downward movement of said mandrel into radially outward movement of said jaws in order to expand a tubular part surrounding said die segments; a hydraulic motor in said base comprising a cylinder, a piston enclosed in said cylinder and a drawbar coupled to said piston that protrudes upwardly from said cylinder in alignment with said mandrel; a source of fluid pressure; means to selectively communicate said source with opposite sides of said piston to vertically reciprocate said piston; a tubular coupling connecting the lower end of said mandrel to the upper end of said drawbar; a cylindrical member threadedly mounted on said coupling for axially adjustable movement thereon; a large sprocket wheel concentrically rigidly mounted on said member; a rotatably mounted drive shaft extending vertically between said base and table; a drive sprocket axially slidably mounted on said shaft and coupled thereto for rotation in unison with said shaft; means interconnecting said member and said shaft for maintaining said large sprocket and drive sprocket in alignment; an endless roller chain drivingly connecting said sprockets; a remotely controllable motor coupled to said shaft that can be energized to adjust the position of said member on said coupling; a stop collar affixed to said base through which said drawbar extends, said collar providing an abutment for limiting downward movement of said member and mandrel, and expansion of said jaws and die segments; and means on said work table to retract said jaws from expanded position concurrently with raising of said mandrel.

7. A device as set forth in claim 6 in which the threaded mounting of said member and coupling is of predetermined pitch and said sprockets are coupled with a predetermined ratio therebetween, and a mechanical counter is coupled to said drive shaft in a predetermined ratio whereby said counter is calibrated to indicate the spacing between said member and said stop collar when said mandrel is in raised position.

8. A device as set forth in claim 6 in which means are provided for indicating the spacing between said member and said stop collar when said mandrel is in raised position, said means comprising: an annular plate concentrically affixed to the upper end of said member, that is of greater diameter than said member; a plurality of projections on said plate that are equally circularly spaced around the outer edge of said plate; and a microswitch mounted for vertical movement in unison with said member, said microswitch being electrically connected to a solenoid actuated counter and having a switch arm adapted to engage said projections during rotation of said member to momentarily close said microswitch and actuate said counter, whereby increments of vertical movement of said member on said coupling are indicated by said counter.

9. A method of stretchforming a tubular sheet metal part comprising: radially expanding a plurality of die segments within said part to circularly stretch said part a predetermined distance, with portions of said part being stretched between said expanded and circularly spaced segments; radially retracting said segments; circularly moving said part relative to said segments to place different portions of said part opposite the faces of said die segments; and radially expanding said segments to further circularly stretch said part, whereby other portions of said part are stretched between said expanded die segments.

10. An expanding mandrel press comprising: a table having a central opening therethrough; a plurality of expanding members grouped around said opening and mounted on said table for sliding radial reciprocation; a longitudinally reciprocable tapered mandrel extending through said opening, said mandrel being operatively engaged with said members to effect said radial reciprocation coordinately with said longitudinal reciprocation; power means to reciprocate said mandrel; adjustable stop means including a pair of relatively movable abutments, one of which is stationary and the other of which is carried by said mandrel in operative alignment with said stationary abutment, said other abutment being adapted for selective adjusting movement relative to said mandrel to vary the length of the stroke of said mandrel in a direction to effect expansion of said members; direct drive means for effecting adjusting movement of said other abutment; and counter means coupled to said drive means and calibrated to visually indicate the adjusted spacing between said abutments.

11. An expanding mandrel press comprising: a table having a central opening therethrough; a plurality of expanding members grouped around said opening and mounted on said table for sliding radial reciprocation with respect to said opening; a longitudinally reciprocable tapered mandrel extending through said opening, said mandrel being operatively engaged with said members to effect said radial reciprocation coordinately with said longitudinal reciprocation; power means to reciprocate said mandrel; adjustable stop means including a pair of relatively movable abutments, one of which is stationary and the other of which is carried by said mandrel in operative alignment with said stationary abutment, said other abutment being adapted for selective adjusting movement relative to said mandrel to vary the length of stroke of said mandrel in a direction to effect expansion of said members; a means operatively associated with said power means and having an actuating member disposed in alignment with said other abutment that is engageable with said other abutment during movement in the opposite direction of said mandrel, said actuating member responding to contact with said other abutment to de-energize said power means to arrest movement of said mandrel in said opposite direction; direct drive means for effecting adjusting movement of said other abutment; and counter means coupled to said drive means calibrated to visually indicate the adjusted spacing between said abutments.

References Cited in the file of this patent

UNITED STATES PATENTS

| | | |
|---|---|---|
| 684,432 | Isler | Oct. 15, 1901 |
| 1,759,262 | Kennedy | May 20, 1930 |
| 1,774,762 | Roesen | Sept. 2, 1930 |
| 2,249,805 | Bechtol | July 22, 1941 |
| 2,557,722 | Brauchler | June 19, 1951 |
| 2,654,413 | Weidal | Oct. 6, 1953 |
| 2,735,473 | Diget et al. | Feb. 21, 1956 |
| 2,780,271 | Ewart et al. | Feb. 5, 1957 |